US005120152A

United States Patent [19]

Gueli

[11] Patent Number: 5,120,152

[45] Date of Patent: Jun. 9, 1992

[54] FUSIBLE LINK

[76] Inventor: Carmen Gueli, 3655 Schauman Rd., Saginaw, Mich. 48601

[21] Appl. No.: 542,759

[22] Filed: Jun. 25, 1990

[51] Int. Cl.[5] F16B 5/07

[52] U.S. Cl. 403/179; 403/270; 403/271; 24/602; 169/42

[58] Field of Search 403/270-272, 403/24, 179; 169/42; 220/89.3; 24/602, 304, 115 F; 228/136; 16/48.5

[56] References Cited

U.S. PATENT DOCUMENTS

| | | | |
|---|---|---|---|
| 3,348,617 | 10/1967 | Macartney | 169/42 |
| 3,613,795 | 10/1971 | Amicone et al. | 169/42 |
| 3,779,004 | 12/1973 | Gloeckler | 24/602 X |
| 3,866,686 | 2/1975 | Goodsell, Jr. et al. | 169/42 X |
| 4,055,829 | 10/1977 | Ruegsegger | 169/42 X |
| 4,103,272 | 7/1978 | Larsen | 169/42 X |
| 4,343,364 | 8/1982 | Glinecke | 169/42 X |
| 4,346,554 | 8/1982 | Glinecke | 169/42 X |
| 4,527,635 | 7/1985 | Kirchner | 169/42 X |
| 4,532,681 | 8/1985 | Baker et al. | 403/2 X |
| 4,738,314 | 4/1988 | Lee | 169/42 |
| 4,757,865 | 7/1988 | Simons | 169/42 X |
| 4,893,679 | 1/1990 | Martin et al. | 169/42 X |

FOREIGN PATENT DOCUMENTS

| | | | |
|---|---|---|---|
| 1289513 | 2/1987 | U.S.S.R. | 169/42 |

*Primary Examiner*—Randolph A. Reese
*Assistant Examiner*—Heather Chun
*Attorney, Agent, or Firm*—Learman & McCulloch

[57] ABSTRACT

A fusible link has two generally oval members in overlying relationship, the two members having relatively flat surfaces confronting one another. One member has a quadrangular slot therein having tapered surfaces and the second member has a quadrangular projection having beveled sides complementing the tapered surfaces. The projection is accommodated in the slot and seats on the tapered surfaces of the latter to provide a space between the confront surfaces. The space is filled with a eutectic alloy which secures the members together. Pins on the members maintain the thickness of the space uniform. When the alloy is heated to a predetermined temperature it melts, thereby enabling the members to separate.

11 Claims, 1 Drawing Sheet

FIG-1
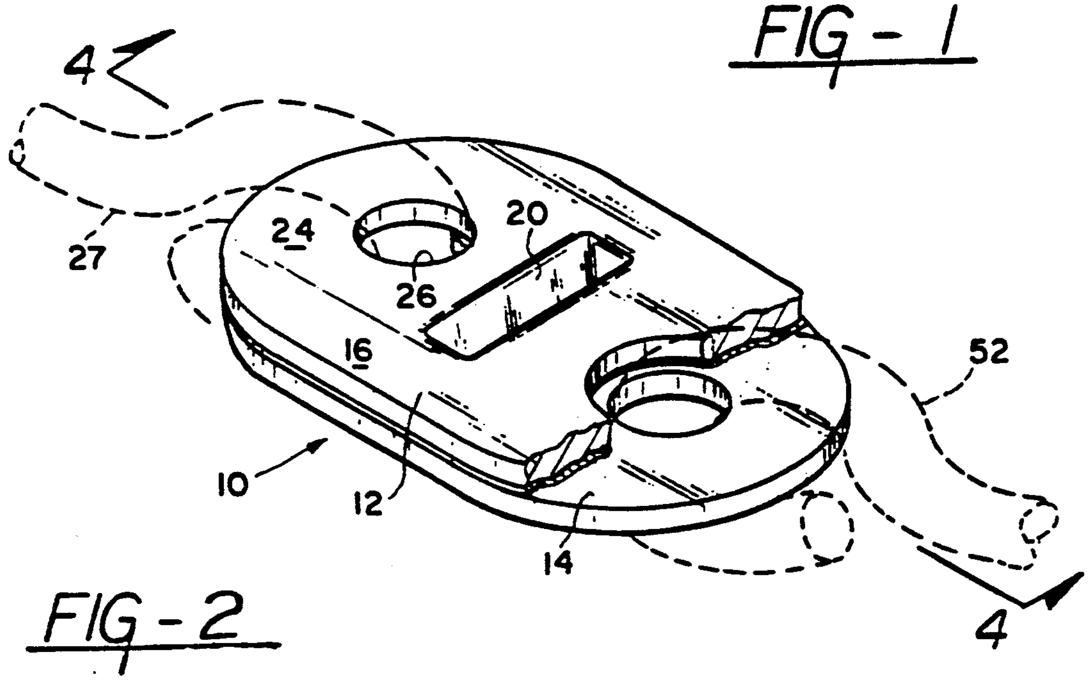
FIG-2
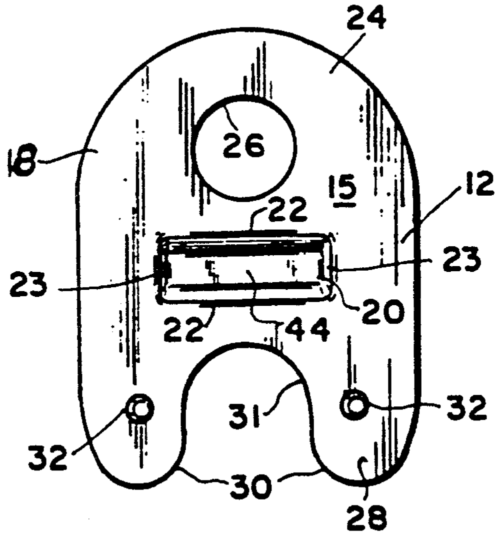
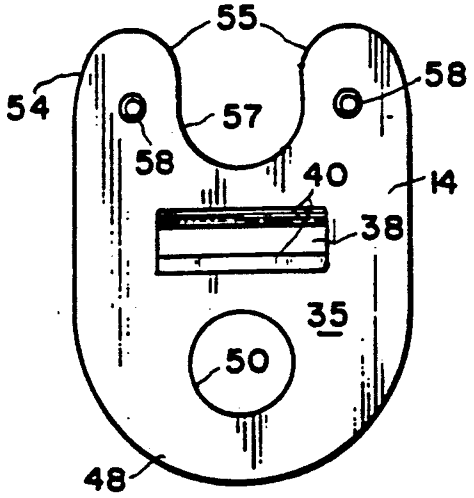
FIG-3
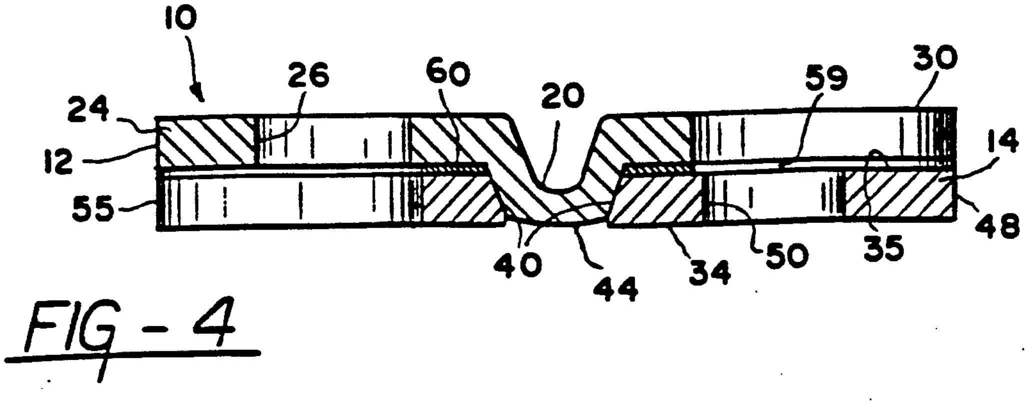
FIG-4

FUSIBLE LINK

The invention relates to a fusible link having a pair of joined members which separate in response to a predetermined increase in ambient temperatures.

BACKGROUND OF THE INVENTION

Fusible link constructions have been used for releasing a locking mechanism, closing of a fire door, releasing a sprinkler operating lever, and the like. Conventionally, such mechanisms have a weight or spring-biased actuator maintained in a non-operating position against the bias of the weight or spring by means of the fusible link which, in response to an increase to a predetermined level of the ambient temperature, separates and enables the bias imposed on the operator to move the latter from its non-operating position to its operating position.

Various kinds of fusible links have been proposed heretofore, one of the most common of which comprises a pair of flat plates arranged side-by-side and separably bonded to one another by a thermally sensitive substance which liquefies when its temperature is raised to a predetermined level, thereby destroying the bond between the plates and permitting them to separate.

One of the disadvantages of the side-by-side plates bonded to one another is that thermally sensitive bonding material has a tendency to creep over a period of time, particularly if it is subjected to tensile or compressive forces. In time, therefore, the bonding material may creep to an extent that it is incapable of maintaining the plates in joined condition or causes shortening or elongating of the assembly to the point that proper operation of the mechanism whose operation is to be controlled cannot be ensured.

One type of fusible link assembly designed to prevent creep over time is disclosed in U.S. Pat. No. 4,346,554 issued Aug. 31, 1982. In this construction two body members are separably coupled to one another and normally prevented from separating by a collapsible strut. One body member has an opening within which the other body member is slideably accommodated. The strut is accommodated within the opening and reacts between the two body members to preclude movement of the slideable body. The strut includes a eutectic alloy which liquefies when its temperature rises to a predetermined level which, in turn, permits the overall length of the strut to shorten, thereby enabling the abutment of the slideable body to pass through the opening in the other body and effect separation of the bodies.

U.S. Pat. No. 4,532,681 issued Aug. 6, 1985, discloses a fusible link wherein a first member includes a cylindrical aperture of a first diameter and a second member includes a cylinder of a second diameter less than the first diameter. The second member is received within the cylindrical aperture. Thermally sensitive solder joins the two members. A spring biases the first member away from the second member so that, when the temperature increases above a predetermined level, the solder liquefies and the two members are separated by the spring.

Other types of fusible links include flat members arranged side-by-side and having a dimple and projection arrangement, or a tongue and groove arrangement to prevent creep.

SUMMARY OF THE INVENTION

A fusible link assembly constructed in accordance with the invention comprises first and second plate-like members in overlying relation and having relatively flat surfaces confronting one another. One of the members has a quadrangular slot therein. At least one of the longer sides of the slot has a beveled a tapered edge. The second member has a quadrangular projection extending therefrom which is of such size as to be accommodated in the slot. At least one side of the projection has a beveled tapered edge confronting and complementing the tapered edge of the slot. A thermally sensitive, eutectic alloy is interposed between the confronting surfaces of the two members and bonds them to one another as long as the ambient temperature is at a level lower than a predetermined temperature. Upon an increase in the ambient temperature to the predetermined temperature, the alloy liquefies and permits separation of the first and second members. The accommodation of the projection in the slot prevents creeping of the first member with respect to the second member.

The projection and the slot preferably are so configured that, when the projection is fully seated in the slot, a space is provided between the confronting surfaces of the first and second members. Each of the two members is provided with pins that extend toward and engage the other member to maintain the confronting surfaces of the two members parallel and the space therebetween uniform.

THE DRAWINGS

A preferred embodiment of the invention is disclosed in the accompanying drawings wherein:

FIG. 1 is an isometric view of the invention showing top and bottom members in assembled relation;

FIG. 2 is a bottom plan view of the top member;

FIG. 3 is a top plan view of the bottom member; and

FIG. 4 is an enlarged cross sectional view taken along the line 4—4 of FIG. 1.

THE PREFERRED EMBODIMENT

A fusible link assembly 10 constructed in accordance with the invention comprises a first or top member 12 and a second or bottom member 14. Both members are made of a high temperature-resistant metal. The first member 12 and the second member 14 are generally of oval configuration in plan.

The first member 12 has a substantially flat top surface 16 and a substantially flat bottom surface 18. A quadrangular projection 20 is formed in the center of the member 12 by deformation thereof and extends beyond the bottom surface 18. At least one, and preferably both, of the two longer sides 22 of the projection are beveled and extend from a wider base at the surface 18 to a narrower top surface. The beveled surfaces of the sides 22 converge from the surface 18 at an angle of approximately 40° to the vertical. The remaining two shorter sides 23 of the projection are perpendicular to the surfaces 16, 18.

One end 24 of the member 12 has an aperture 26 therethrough for the accommodation of a first hook-like attachment member 27. The other end 28 of the member 12 is generally U-shaped having two limbs 30 on opposite sides of a gap 31. Each of the limbs 30 carries a pin 32 projecting an equal distance from the bottom surface 18.

The second or bottom member 14 has a bottom surface 34 and a substantially flat top surface 35. At the center of the member 14 is a quadrangular slot 38. The slot 38 includes two longer, transversely extending sides 40. The longer sides 40 have tapered surfaces on which the beveled surfaces 22 of the projection 20 are adapted to seat. The tapered surfaces diverge in a direction toward the surface 35 at an angle complementary to the angle of convergence of the beveled surfaces of the slot of the projection 20. The projection has a bottom 44 between the tapered surfaces 40. The two shorter sides 46 of the slot 38 are perpendicular to the surface 35.

The member 14 has adjacent one end 48 an aperture 50 therein for accommodating a second hook-like attachment member 52. The opposite end 54 of the member 14 is generally U-shaped and has limbs 55 defining a gap 57. Each of the limbs 55 carries a pin 58 extending a uniform distance from the surface 35.

The member 12 and the member 14 may be assembled properly in only one relation, i.e., with the surface 18 confronting the surface 35 and with the openings 26 and 50 at opposite ends of the assembly. In this relationship the limbs 30 of the member 12 straddle the opening 50 of the member 14, thereby providing clearance for the attachment member 52. Likewise, the limbs 55 of the member 14 straddle the opening 26 of the member 12 to enable insertion of the first attachment member 27 in the opening 26.

As is best shown in FIG. 4 the height of the projection 20 and the angular relationship of its surfaces 22 are such that, when the surfaces 22 are seated on the surfaces 40 of the slot 38, a clearance 59 exists between the confronting surfaces 18 and 35 of the respective members. The pins 32 of the member 12 engage the surface 35 on opposite sides of the aperture 50 and the pins 58 of the member 14 engage the surface 18 on opposite sides of the aperture 26 to maintain the members 12, 14 spaced apart and parallel with one another, thereby establishing and maintaining a uniform thickness of the clearance 59.

Thermally sensitive means 60 occupies the clearance 59 between the surfaces 16 and 34 and normally bonds the member 12 to the member 14. The thermally sensitive means 60 comprises a eutectic alloy which liquefies at a predetermined temperature. The pins 32, 58 ensure that the layer of eutectic alloy 60 is of uniform thickness. At temperatures below the predetermined temperature, the eutectic alloy 60 remains solid and bonds the two members 12, 14 together. When the temperature increases to the predetermined level, such as 135° F., the alloy 60 will liquefy allowing the members 12 and 14 to separate. The uniformity of the thickness of the alloy layer ensures liquefication of the entire layer at substantially the same time, thereby promoting quick separation of the members upon the temperature's reaching the predetermined level.

In use, one end of the link assembly 10 may be connected by a chain and one of the attachment members to a fire door and the other end connected by the other attachment member and a chain to a stationary wall. Normally, the fire door is biased toward its closed position, thereby imposing a tensile force on the members 12, 14 tending to separate them. However, the fusible link overcomes the bias and holds the door open.

The accommodation of the projection 20 within the slot 38, in conjunction with the alloy 60, prevents creeping of one member 12 with respect to the other member 14 over time and when the ambient temperature is at a level below the predetermined temperature. Upon an increase in the ambient temperature to a level at or above that of the predetermined temperature, however, the alloy 60 will melt whereupon the members 12 and 14 may separate, and the separation is ensured because of the confronting beveled and tapered surfaces of the projection and slot, respectively.

Although both sides 22 of the projection 20 and both sides 40 of the slot 38 are disclosed as being beveled and tapered, it is possible to bevel only one side of the projection and taper only one side of the slot, so long as these sides are so oriented as to slide over one another in response to melting of the alloy 60. In this type of construction the possibility of assembling the members of the link improperly is extremely remote inasmuch as improper assembly will prevent seating of the beveled and tapered surfaces on one another.

The disclosed embodiment is representative of a presently preferred form of the invention, but is intended to be illustrative rather than definitive thereof. The invention is defined in the claims.

I claim:

1. A fusible link assembly comprising a first link member; a second link member, said first and second link members being arranged in overlying relation with a surface of said first member confronting a surface of said second member; a projection on one of said members extending beyond said surface thereof in a direction toward the other of said members, said projection having opposite sides at least one of which is beveled at an angle to the surface of said one of said members, the other of said members having a slot therein accommodating said projection, said slot having opposed sides at least one of which is tapered at an angle which complements said beveled side of said projection, said beveled side of said projection and said tapered side of said slot engaging one another and the other side of said projection engaging the other side of said slot at such level on said projection as to provide a space between the confronting surfaces of said members; spacing pins carried by at least one of said members on opposite sides of said projection and projecting from said surface in a direction to engage the confronting surface of the other of said members and maintain said space substantially uniform in thickness; and thermally sensitive bonding means occupying said space and securing said members to one another, said bonding means being solid below a predetermined temperature and liquid at and above said predetermined temperature.

2. The assembly according to claim 1 wherein said projection and said slot are rectangular in plan.

3. The assembly according to claim 1 wherein both of the opposite sides of said projection are beveled.

4. The assembly according to claim 3 wherein both of the opposed sides of said slot are tapered.

5. The assembly according to claim 4 wherein said beveled sides and said tapered sides are complementary.

6. The assembly according to claim 1 wherein said spacing pins are carried by each of said members.

7. The assembly according to claim 6 wherein one of said members carries said spacing pins adjacent one end thereof in a position to seat on the confronting surface of the other of said members, and said other of said members carries said spacing pins adjacent that end thereof which confronts the surface of said one of said members.

8. The assembly according to claim 1 wherein said first member has an opening at one end thereof and said second member has a pair of limbs straddling said opening and defining a gap between said limbs.

9. The assembly according to claim 1 wherein each of said members has an opening at one end thereof and a pair of spaced apart limbs at its opposite end, the limbs of one of said members straddling the opening of the other of said members and the limbs of the other of said members straddling the opening of said one of said members.

10. A fusible link assembly comprising a first link having an opening at one end thereof and a pair of limbs spaced by a gap at its opposite end; a second link having an opening at one end thereof and a pair of limbs spaced by a gap at its opposite end, said links being arranged in overlying relation with a surface of said first link confronting a surface of said second link and the limbs of each link straddling the opening of the respective other link; a projection carried by said first link between the ends thereof and extending in a direction toward said second link, said second link having a slot between its ends in which said projection is accommodated, said projection having opposite beveled sides converging in a direction toward said second link and said slot having opposed sides tapering complementally to said beveled sides of said projection, said beveled sides of said projection engaging the tapered sides of said slot at a level of said projection such as to provide a space between the confronting surfaces of said first and second links; a plurality of spacer pins carried by the limbs of said first link and extending toward said second link; a plurality of spacer pins carried by the limbs of said second link and extending toward said first link, said spacer pins being of substantially uniform height for maintaining said links spaced from one another; and thermally sensitive bonding means occupying the space between said links and securing said links to one another, said bonding means being solid below a predetermined temperature and liquid at and above said predetermined temperature, the beveled and tapered sides of said projection and said slot enabling relative sliding movement in one direction of said links and removal of said projection from said slot and separation of said links in response to liquefication of said bonding means.

11. The assembly according to claim 10 wherein said projection and said slot have flat end walls perpendicular to the confronting surfaces of the respective links.

* * * * *